Oct. 25, 1927.  
K. KASHIWAGI  
1,646,914  
CLINICAL THERMOMETER AND METHOD OF MANUFACTURE OF SAME  
Filed Sept. 25, 1924
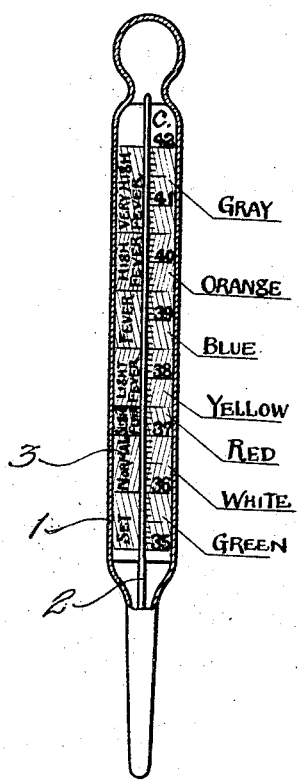
Inventor  
K. Kashiwagi  
by Langner, Parry, Card + Langner  
Att'ys.

Patented Oct. 25, 1927.

1,646,914

UNITED STATES PATENT OFFICE.

KOSUKE KASHIWAGI, OF YAMAGUCHI, JAPAN.

CLINICAL THERMOMETER AND METHOD OF MANUFACTURE OF SAME.

Application filed September 25, 1924, Serial No. 739,883, and in Japan February 19, 1924.

This invention relates to improvements in clinical thermometers and in the method of manufacture thereof. The thermometer comprises a graduated scale with degrees indicated as usual, and the scale is divided longitudinally into a series of divisions each of which is colored a different color from that of the adjacent division or divisions.

A clinical thermometer with a longitudinal scale, and marked with words indicating the kinds of fever corresponding to a particular range of the scale, is old. In such thermometers, the dividing line between divisions is often missed or overlooked by confusing it with the graduations.

The length and the position of a scale range corresponding to a given kind of fever, is not constant. In other words, the length and the position of a range from 37° C. to 38° C., for example, on one thermometer is in general not the same as on others. Therefore, the dividing lines and the words in the above mentioned type of thermometer, must be specially engraved for each instrument, so that production is hindered and consequently its cost is increased. The reason why a unit scale range of each thermometer has a specific length is, that the capacity of the bulb and the diameter of the tube bore is not exactly the same for all thermometers. However, the difference in the length of a unit scale range for a specific type of thermometer, is not very great, so that, if about two hundred units of scale range of slightly differing lengths included between the maximum and the minimum length of a unit scale range be established, the unit scale range of a given thermometer will substantially coincide with some one of the two hundred units, the maximum and the minimum length for a unit scale range being determinable by actual measurement.

In my invention I prepare a number of units of scale range, for example, two hundred or more, of slightly different length for one specific kind of thermometer, and the scale is divided longitudinally into a certain number of ranges, and each division is colored with a color which differs from that of the adjacent divisions. The scales are prepared by direct printing or by off-set printing.

The accompanying figure of drawing shows one embodiment of the invention.

In the drawing, 1 indicates a thermometer having a tube 2, positioned over a graduated scale 3.

The longitudinal divisions of the scales and the colors thereon are determined from a medical point of view. I prefer to divide the length of the scale into seven parts, and mark and color them as shown in the figure of drawing and in the below table.

| | | |
|---|---|---|
| Up to 36°C. | "Set" | Green. |
| 36°C. to 37°C. | "Normal" | White. |
| 37°C. to 37.5°C. | "Slight fever" | Red. |
| 37.5°C. to 38.5°C. | "Light fever" | Yellow. |
| 38.5°C. to 39.5°C. | "Fever" | Blue. |
| 39.5°C. to 40.5°C. | "High fever" | Orange. |
| 40.5°C. and higher | "Very high fever" | Gray. |

Green, red, blue and gray sharply contrast with white, yellow and orange, so that the limits of each scale range are very distinctive. This invention however, is not limited to the specific number of divisions, their marks, and colors above described.

By coloring the scale ranges, not only does a range become easily distinguished from the adjacent ones, but also the record of a thermometer becomes very significant. This is because we feel different sensations due to different colors, so that to one who is reminded of fever by a yellow color, the color will be more suggestive to him than the word "Fever". Thus my thermometer is useful for ordinary households where medical and hygienic knowledge is comparatively slight.

In carrying out my invention, a partly completed thermometer, the bore of which has been sealed but not graduated, is marked with two standard points of temperature, for example, the points corresponding to 35°C. and 42°C., in any well known manner, and then a scale plate whose length between two corresponding graduations is the same as the distance along the bore between the two standard points, is selected from the units prepared, and inserted into the outer tube of the thermometer along the mercury bore so as to make the corresponding graduations of the plate and the two standard points of the thermometer coincide, and then the outer tube is sealed, its open end keeping the scale plate in the proper position. If the thermometer is such that a scale plate cannot be directly attached to its body, graduations, figures and colors are printed on the thermometer by off-set printing. In this case the lines, letters and colors are first printed on a strip of paper, which has been pre-treated, for example, coated with a thin film of gelatine, so as to enable easy transfer of the printed matter. A number of units of such printed paper strips are prepared in the same manner as are the printed scale plates above described. After two standard points of a partly completed thermometer are marked, a printed paper strip of a proper length of graduations, is selected from the units, and is placed on the body of the thermometer with its printed side down. Then the paper strip is moistened, in order to separate the printed matter from the paper strip, and the paper is finally removed from the body, thus leaving the printed matter on the thermometer.

I claim:—

A method for manufacturing a clinical thermometer, comprising, preparing a number of scale plates having slightly differing lengths for a unit range of temperature, each scale plate being graduated longitudinally and each division being colored with a color different from that of any adjacent division, and attaching an appropriate scale plate selected from the units, to the body of a partly completed thermometer.

In testimony whereof I have signed my name to this specification.

KOSUKE KASHIWAGI.